United States Patent [19]

Schweier et al.

[11] 4,454,299

[45] Jun. 12, 1984

[54] PREPARATION OF PROPYLENE/ETHYLENE BLOCK COPOLYMERS

[75] Inventors: Guenther Schweier, Friedelsheim; Wolfgang Gruber, Frankenthal; Werner Metzger, Hessheim; Peter Hennenberger, Freinsheim, all of Fed. Rep. of Germany

[73] Assignee: BASF Aktiengesellschaft, Fed. Rep. of Germany

[21] Appl. No.: 485,445

[22] Filed: Apr. 15, 1983

[30] Foreign Application Priority Data

Apr. 17, 1982 [DE] Fed. Rep. of Germany ....... 3214246

[51] Int. Cl.$^3$ ............................................ C08F 297/08
[52] U.S. Cl. ...................................... 525/53; 525/247; 525/268; 525/270; 525/323
[58] Field of Search ................. 525/53, 247, 270, 323, 525/268

[56] References Cited

U.S. PATENT DOCUMENTS 3,974,237 8/1976 Brumbaugh ........................... 525/53

FOREIGN PATENT DOCUMENTS

| 837301 | 6/1960 | United Kingdom . |
| 1006469 | 10/1965 | United Kingdom . |
| 1032945 | 6/1966 | United Kingdom . |
| 1354020 | 5/1974 | United Kingdom . |

*Primary Examiner*—Melvyn I. Marquis
*Assistant Examiner*—Patricia Short

*Attorney, Agent, or Firm*—Keil & Weinkauf

[57] ABSTRACT

Propylene/ethylene block copolymers are prepared by a process in which, in an agitated fixed bed comprising small polymer particles and in each case in the presence of hydrogen, first (I) propylene is homopolymerized from the gas phase, in a first polymerization zone, by feeding in a Ziegler-Natta catalyst, and then (II) the product obtained in the first polymerization zone is fed into a second polymerization zone, where a mixture of propylene and ethylene is polymerized with the propylene homopolymer present in the product from the first polymerization zone. The process has the following features: (a) in the first polymerization zone, polymerization is carried out at a particular total pressure and at a particular temperature, with the proviso that the ratio of the partial pressure of propylene to that of hydrogen (P/H-I) has a specific value, (b) in the second polymerization zone, polymerization is carried out at a particular total pressure and at a particular temperature, with the provisos that (i) the ratio of the partial pressure of propylene to that of ethylene and (ii) the ratio of the partial pressure of propylene to that of hydrogen (P/H-II) have specific values, (c) the total pressure in the first polymerization zone is kept substantially higher than that in the second polymerization zone, (d) the temperature in the second polymerization zone is chosen to be substantially lower than that in the first polymerization zone, and (e) the ratio of P/H-I to P/H-II has a specific value. Polymers having high impact strength and good morphological properties are obtained.

1 Claim, No Drawings

PREPARATION OF PROPYLENE/ETHYLENE BLOCK COPOLYMERS

The present invention relates to a process for the preparation of propylene/ethylene block copolymers in which, in an agitated fixed bed comprising small polymer particles, in each case in the presence of hydrogen as a molecular weight regulator and in the absence of a liquid reaction medium, first (I) propylene is homopolymerized, from the gas phase, in a first polymerization zone, by feeding in a Ziegler-Natta catalyst comprising
  (1) a titanium(III) component and
  (2) a dialkyl-aluminum chloride component, with or without
  (3) a further catalyst component, and then
(II) the product obtained in the first polymerization zone is fed into a second polymerization zone, where a mixture of propylene and ethylene is polymerized with the propylene homopolymer present in the product from the first polymerization zone, with the provisos that (i) the atomic ratio of titanium from the titanium(III) component (1) to aluminum from the dialkyl-aluminum chloride component (2) is from 1:1 to 1:20, in particular from 1:2 to 1:15, and (ii) the weight ratio of propylene converted to polymer in the first polymerization zone to the propylene/ethylene mixture converted to polymer in the second polymerization zone is from 100:5 to 100:30, in particular from 100:10 to 100:25.

Process of this type, ie. in particular those which it is essential to carry out in a fixed bed comprising small polymer particles and in the absence of a liquid reaction medium, are known, and are used industrially. Their development is reflected in the processes which have been disclosed initially in British Pat. No. 837,301, then in British Pat. No. 1,006,469 and finally in British Pat. No. 1,032,945; it has been found to be advantageous if each of the stages (I) and (II) of the process from the last-mentioned patent is carried out in the same manner as the single stage of the process disclosed in British Pat. No. 1,354,020.

The conventional processes under discussion have in general been successfully employed industrially; however, they may still be unsatisfactory in some respects. Thus, for example, while it is desirable, it has not been possible hitherto to obtain polymers which possess high impact strength, in particular good low-temperature impact strength and at the same time good pourability. If the procedure is carried out so as to give high impact strength, the resulting polymers, in particular those obtained in the second polymerization zone, possess unsatisfactory pourability. The latter characteristic is caused in particular by the polymers possessing a certain tackiness, which, inter alia, hinders stirring (ie. thorough mixing and hence, finally, also the heat exchange), entails the risk that the polymer sticks to the walls, and has an adverse effect on transport.

It is an object of the present invention to provide a method of carrying out the process defined at the outset, ie. to improve this process, so that it possesses the above disadvantage to a substantially reduced extent, if at all.

We have found that this object is achieved if (i) in the first and in the second polymerization zones the reactions are carried out under a particular total pressure and at a particular temperature, and employing specific relationships between the partial pressures of the reactants, and (ii) the total pressure and the temperature in the first polymerization zone differs from those in the second polymerization zone by a particular amount, and the ratios of the partial pressures in the different zones in turn bear a specific relationship to each other.

The present invention accordingly relates to a process for the preparation of propylene/ethylene block copolymers, in which, in an agitated fixed bed comprising small polymer particles (which, to those skilled in the art, is a bed containing small loose polymer particles which is kept in motion by stirring), in each case in the presence of hydrogen as a molecular weight regulator and in the absence of a liquid reaction medium, first (I) propylene is homopolymerized, from the gas phase, in a first polymerization zone, by feeding in a Ziegler-Natta catalyst comprising
  (1) a titanium(III) component and
  (2) a dialkyl-aluminum chloride component, with or without
  (3) a further catalyst component, and then
(II) the product obtained in the first polymerization zone is fed into a second polymerization zone, where a mixture of propylene and ethylene is polymerized with the propylene homopolymer present in the product from the first polymerization zone, which the provisos that (i) the atomic ratio of titanium from the titanium(III) component (1) to aluminum from the dialkyl-aluminum chloride component (2) is from 1:1 to 1:20, in particular from 1:2 to 1:15, and (ii) the weight ratio of propylene converted to polymer in the first polymerization zone to the propylene/ethylene mixture converted to polymer in the second polymerization zone is from 100:5 to 100:30, in particular from 100:10 to 100:25.

In the novel process, (a) in the first polymerization zone, the reaction is carried out under a total pressure of from 11 to 40, preferably from 24 to 33, bar and at from 60° to 80° C., preferably from 70° to 75° C., with the proviso that the ratio of the partial pressure of propylene to that of hydrogen (P/H-I) is from 100:0.1 to 100:15, preferably from 100:0.5 to 100:10, (b) in the second polymerization zone, the reaction is carried out under a total pressure of from 7 to 20, preferably from 10 to 16, bar and at from 45° to 60° C., preferably from 50° to 55° C., with the provisos that (i) the ratio of the partial pressure of propylene to that of ethylene is from 100:10 to 100:60, preferably from 100:20 to 100:50, and (ii) the ratio of the partial pressure of propylene to that of hydrogen (P/H-II) is from 100:2 to 100:70, preferably from 100:5 to 100:50, (c) the total pressure in the first polymerization zone is kept not less than 10 bar higher than that in the second polymerization zone, (d) the temperature in the second polymerization zone is kept not less than 10° C., preferably not less than 15° C., lower than that in the first polymerization zone, and (e) the relationship between the ratio partial pressure of propylene:partial pressure of hydrogen in the first polymerization zone (P/H-I) and the ratio partial pressure of propylene:partial pressure of hydrogen in the second polymerization zone (P/H-II) is set so that the ratio P/H-I:P/H-II is from 0.1 to 400, preferably from 2 to 70.

As regards the novel process, the following points may be noted specifically.

The polymerization process as such can be carried out in virtually any appropriate conventional technological form, for example as a batchwise, periodic or continuous procedure, the special features characteristic of the process being taken into account. The above forms, ie. the technological embodiments of the gas-phase block copolymerization of propylene/ethylene in two polymerization zones by the Ziegler-Natta method, are, as stated at the outset, well known from the literature and in industry, and therefore do not require further description here.

For the sake of completeness it may however be mentioned that, in the novel process, the components of the catalyst may be introduced into the first polymerization zone in a variety of ways: for example, (i) the titanium(III) component (1) and the dialkyl-aluminum chloride component (2), with or without the further catalyst component (3), can be introduced together at the same point, (ii) these components can be introduced at separate points, (iii) component (1) on the one hand and a mixture of components (2) and (3) on the other hand can be introduced at separate points (this method may be particularly advantageous), or (iiii) a mixture of components (1) and (3) on the one hand and component (2) on the other hand can be introduced at separate points.

In the novel process, moreover, the lower the ratio of the partial pressure of propylene to that of hydrogen (P/H-I) in the first polymerization zone, the higher of course is the melt index of the polymer obtained as the end product, and vice versa. It has also been found that, in the first and/or second polymerization zone, a higher ratio of the partial pressure of propylene to that of hydrogen results in a lower proportion of very small particles in the polymer.

As regards the composition of the catalysts employed in the novel process, the following may be stated specifically:

In respect of the titanium(III) component (1): suitable titanium(III) components are the appropriate conventional ones, and, inter alia, the following two groups, which are particularly suitable for use in the process according to the invention, may be singled out:

(1a) titanium trichlorides as such, and titanium chloride co-crystallization products with metal halides, in particular aluminum chloride, for example products of the formula $TiCl_3 \cdot \frac{1}{3}AlCl_3$. In this context, see, for example, U.S. Pat. Nos. 3,128,252 and 3,814,743.

It has been found that from this group a very finely divided co-crystallization product of the formula $TiCl_3 \cdot \frac{1}{3}AlCl_3$ is particularly suitable for the purpose according to the invention.

(1b) Titanium trichlorides or titanium trichloride co-crystallization products of the type described under (1a), which have been modified with electron donors or Lewis bases. Such modified titanium trichloride catalyst components are known to possess a number of advantages, and there is hence a large number of embodiments of them. To avoid unnecessary repetition, in the above context reference may be made, by way of an illustrative example, to British Pat. No. 851,113.

This is the most suitable group for the purpose according to the invention; specific examples are very finely divided co-crystallization products of the formula $TiCl_3 \cdot \frac{1}{3}AlCl_3$, which have been modified with the following donors or bases: ethers, eg. di-n-butyl ether and diisopentyl ether, esters, eg. $C_1$–$C_5$-alkyl benzoates and ethyl phenylacetate, phosphines, eg. tributylphosphine, phosphine, oxides, eg. triphenylphosphine oxide, and acid amides.

The specific type of modification can be an appropriate conventional one; for example, modifications which may be singled out are those which are particularly suitable for the purpose according to the invention and which are described in British Pat. Nos. 1,447,706, 1,485,181 and 1,512,730 and in U.S. Pat. Nos. 4,120,823, 4,154,699, 4,154,700 and 4,229,318.

In respect of the dialkyl-aluminum chloride component (2): suitable dialkyl-aluminum chloride components are likewise the appropriate conventional ones; these are well known from the literature and in industry, and therefore do not require further description. An example of an outstanding compound of this type is diethyl-aluminum chloride.

In respect of the further catalyst components (3), which may or may not be present: In this case, too, the usual amounts of the compounds which are conventionally used today are employed; these are likewise well known from the literature and in industry, and therefore do not require further description.

However, it should be emphasized that certain phenolic substances can be employed, with very particular success, as further catalyst components (3) for the purpose according to the invention. The phenolic substances are those described in U.S. Pat. No. 4,260,710, and they are used in the amounts which are also stated in that patent. To avoid unnecessary repetition, the above patent is to this extent therefore made part of the disclosure of the present invention.

In general, it may be stated that the substances employed in the novel process as such are the appropriate conventional ones.

EXAMPLE 1

In an appropriate conventional apparatus, ie. a cascade (cf. British Pat. No. 1,032,945 in this context), a propylene/ethylene block copolymer was prepared continuously by a process in which, in each case in an agitated fixed bed (a stirred concentric fixed bed) comprising small polymer particles, and in the absence of a liquid reaction medium, first (I) propylene was homopolymerized, from the gas phase, in a first polymerization zone with a useful volume of 200 liters, by metering in, continuously and separately, a Ziegler-Natta catalyst comprising
  (1) a titanium(III) component prepared as described in Example 2 of British Pat. No. 1,485,181 (in an amount of 15.8 millimoles/hour, calculated as titanium),
  (2) diethyl-aluminum chloride and
  (3) n-octadecyl β-(4'-oxy-3',5'-di-tert.-butylphenyl)-propionate, and then (II) the product obtained in the first polymerization zone was fed into a second polymerization zone with a useful volume of 200 liters, where a mixture of propylene and ethylene was polymerized with the propylene homopolymer present in the product from the first polymerization zone, with the provisos that (i) the atomic ratio of titanium from the titanium(III) component (1) to aluminum from the dialkyl-aluminum chloride component (2) was 1:7, and the molar ratio of titanium from the titanium(III) component (1) to further catalyst component (3), ie. n-octadecyl β-(4'-oxy-3',5'-di-tert.-butylphenyl)-propionate, was 1:0.3, and (ii) the weight ratio of propylene converted to polymer in the first polymerization zone to the propylene/ethylene mixture converted to polymer in the second polymerization zone was 100:17.

The process was carried out in accordance with the invention, the specific procedure being such that (a) in the first polymerization zone, the reaction was carried out under a total pressure of 28 bar and at 70° C., with the proviso that the ratio of the partial pressure of propylene to that of hydrogen (P/H-I) was 100:8, (b) in the second polymerization zone, the reaction was carried out under a total pressure of 11 bar and at 50° C., with the provisos that (i) the ratio of the partial pressure of propylene to that of ethylene was 100:40, and (ii) the ratio of the partial pressure of propylene to that of hydrogen (P/H-II) was 100:42, (c) the total pressure in the first polymerization zone was hence kept 17 bar higher than that in the second polymerization zone, (d) the temperature in the second polymerization zone was chosen to be 20° C. lower than that in the first polymerization zone, and (e) the relationship between the ratio partial pressure of propylene:partial pressure of hydrogen in the first polymerization zone (P/H-I) and the ratio partial pressure of propylene:partial pressure of hydrogen in the second polymerization zone (P/H-II) was set such that the ratio P/H-I:P/H-II was 5.2.

This procedure gave 17.5 kg/hour of a polymer having a melt index of 15 g/10 min, measured at 230° C. in accordance with DIN 53,735; this polymer possessed high impact strength and good morphological properties, in particular good pourability.

EXAMPLE 2

In the apparatus described in Example 1, a propylene-/ethylene block copolymer was once again prepared continuously by a process in which, in each case in an agitated fixed bed (a stirred concentric fixed bed) comprising small polymer particles, and in the absence of a liquid reaction medium, first (I) propylene was homopolymerized, from the gas phase, in a first polymerization zone, by metering in, continuously and separately, a Ziegler-Natta catalyst comprising
  (1) a titanium(III) component prepared as described in Example 2 of British Pat. No. 1,485,181 (in an amount of 12.5 millimoles/hour, calculated as titanium),
  (2) diethyl-aluminum chloride and
  (3) n-octadecyl $\beta$-(4'-oxy-3',5'-di-tert.-butylphenyl)-propionate, and then
(II) the product obtained in the first polymerization zone was fed into a second polymerization zone, where a mixture of propylene and ethylene was polymerized with the propylene homopolymer present in the product from the first polymerization zone, with the provisos that (i) the atomic ratio of titanium from the titanium(III) component (1) to aluminum from the dialkyl-aluminum chloride component (2) was 1:5, and the molar ratio of titanium from the titanium(III) component (1) to further catalyst component (3), ie. n-octadecyl $\beta$-(4'-oxy-3',5'-di-tert.-butylphenyl)-propionate, was 1:0.3, and (ii) the weight ratio of propylene converted to polymer in the first polymerization zone to the propylene/ethylene mixture converted to polymer in the second polymerization zone was 100:20.

The process was carried out in accordance with the invention, the specific procedure being such that (a) in the first polymerization zone, the reaction was carried out under a total pressure of 28 bar and at 70° C., with the proviso that the ratio of the partial pressure of propylene to that of hydrogen (P/H-I) was 100:0.8, (b) in the second polymerization zone, the reaction was carried out under a total pressure of 15 bar and at 50° C., with the provisos that (i) the ratio of the partial pressure of propylene to that of ethylene was 100:25 and (ii) the ratio of the partial pressure of propylene to that of hydrogen (P/H-II) was 100:14, (c) the total pressure in the first polymerization zone was hence kept 13 bar higher than that in the second polymerization zone, (d) the temperature in the second polymerization zone was chosen to be 20° C. lower than that in the first polymerization zone, and (e) the relationship between the ratio partial pressure of propylene:partial pressure of hydrogen in the first polymerization zone (P/H-I) and the ratio partial pressure of propylene:partial pressure of hydrogen in the second polymerization zone (P/H-II) was set such that the ratio P/H-I:P/H-II was 17.5.

This procedure gave 18 kg/hour of a polymer having a melt index of 1.5 g/10 min, measured at 230° C. in accordance with DIN 53,735; this polymer likewise possessed high impact strength and good morphological properties, in particular good pourability.

We claim:
1. A process for the preparation of propylene/ethylene block copolymers, in which, in an agitated fixed bed comprising small polymer particles, in each case in the presence of hydrogen as a molecular weight regulator and in the absence of a liquid reaction medium, first
  (I) propylene is homopolymerized, from the gas phase, in a first polymerization zone, by feeding in a Ziegler-Natta catalyst comprising
    (1) a titanium(III) component and
    (2) a dialkyl-aluminum chloride component, with or without
    (3) a further catalyst component, and then
  (II) The product obtained in the first polymerization zone is fed into a second polymerization zone, where a mixture of propylene and ethylene is polymerized with the propylene homopolymer present in the product from the first polymerization zone, with the provisos that (i) the atomic ratio of titanium from the titanium(III) component (1) to aluminum from the dialkyl-aluminum chloride component (2) is from 1:2 to 1:15, and (ii) the weight ratio of propylene converted to polymer in the first polymerization zone to the propylene/ethylene mixture converted to polymer in the second polymerization zone is from 100:10 to 100:25, wherein (a) in the first polymerization zone, the reaction is carried out under a total pressure of from 24 to 33 bar and at from 70° to 75° C., with the proviso that the ratio of the partial pressure of propylene to that of hydrogen (P/H-I) is from 100:0.5 to 100:10, (b) in the second polymerization zone, the reaction is carried out under a total pressure of from 10 to 16 bar and at from 50° to 55° C., with the provisos that (i) the ratio of the partial pressure of propylene to that of ethylene is from 100:20 to 100:50, and (ii) the ratio of the partial pressure of propylene to that of hydrogen (P/H-II) is from 100:5 to 100:50, (c) the total pressure in the first polymerization zone is kept not less than 10 bar higher than that in the second polymerization zone, (d) the temperature in the second polymerization zone is kept not less than 15° C. lower than that in the first polymerization zone, and
(e) the relationship between the ratio partial pressure of propylene:partial pressure of hydrogen in the first polymerization zone (P/H-I) and the ratio partial pressure of propylene:partial pressure of hydrogen in the second polymerization zone (P/H-II) is set so that the ratio P/H-I:P/H-II is from 2 to 70.

* * * * *